United States Patent
Glugla et al.

(10) Patent No.: US 6,860,244 B2
(45) Date of Patent: Mar. 1, 2005

(54) ENGINE CONTROL WITH OPERATING MODE DETECTION

(75) Inventors: Christopher Paul Glugla, Macomb, MI (US); David Karl Trumpy, Farmington Hills, MI (US); In Kwang Yoo, Ann Arbor, MI (US); William Robert Dutcher, Wayne, MI (US); Woong-chul Yang, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 28 days.

(21) Appl. No.: 10/065,681

(22) Filed: Nov. 8, 2002

(65) Prior Publication Data

US 2004/0089253 A1 May 13, 2004

(51) Int. Cl.[7] .................................. F02B 33/04
(52) U.S. Cl. .................................. 123/78 E; 123/78 A
(58) Field of Search .................. 701/103; 123/316, 123/78 E, 406.23, 197.4, 197.3, 78 R, 48 D, 48 A, 48 AA, 78 D, 78 A, 78 F

(56) References Cited

U.S. PATENT DOCUMENTS

| | | | |
|---|---|---|---|
| 4,834,031 A | | 5/1989 | Katoh et al. |
| 4,860,711 A | * | 8/1989 | Morikawa .................. 123/48 D |
| 6,453,854 B1 | | 9/2002 | Baeuerle et al. |
| 6,612,288 B2 | * | 9/2003 | Cullen .................... 123/406.23 |
| 6,631,708 B1 | * | 10/2003 | Russell et al. ............... 123/685 |
| 6,665,605 B2 | * | 12/2003 | Boyer et al. ................. 701/103 |
| 6,666,177 B1 | * | 12/2003 | Stiebels et al. ........... 123/48 R |

* cited by examiner

*Primary Examiner*—Tony M. Argenbright
*Assistant Examiner*—Hyder Ali
(74) *Attorney, Agent, or Firm*—Gary Smith; Ford Global Technologies, LLC

(57) ABSTRACT

A system and method for detecting an operating mode of an engine or engine component modulate a first engine parameter and analyze a change in a second engine parameter in response to modulating the first engine parameter to detect a current operating mode based on changes in at least one of the first and second engine parameters. In a variable compression ratio (VCR) engine embodiment, the system and method modify ignition timing of at least one cylinder until engine knock is detected and determine whether the cylinder is operating in the lower compression ratio mode or the higher compression ratio mode by comparing the ignition timing change required to cause engine knock to a corresponding threshold.

22 Claims, 3 Drawing Sheets

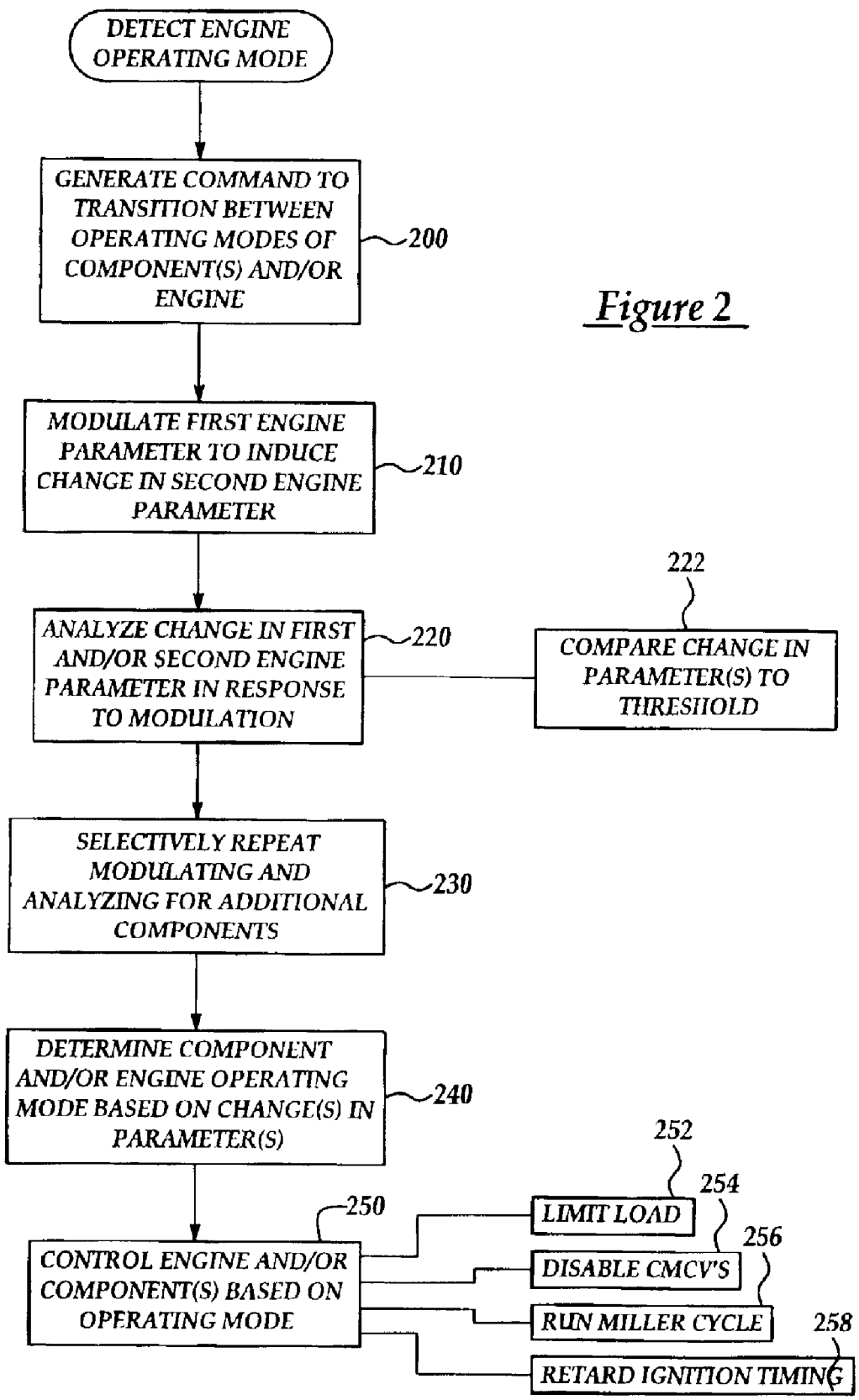

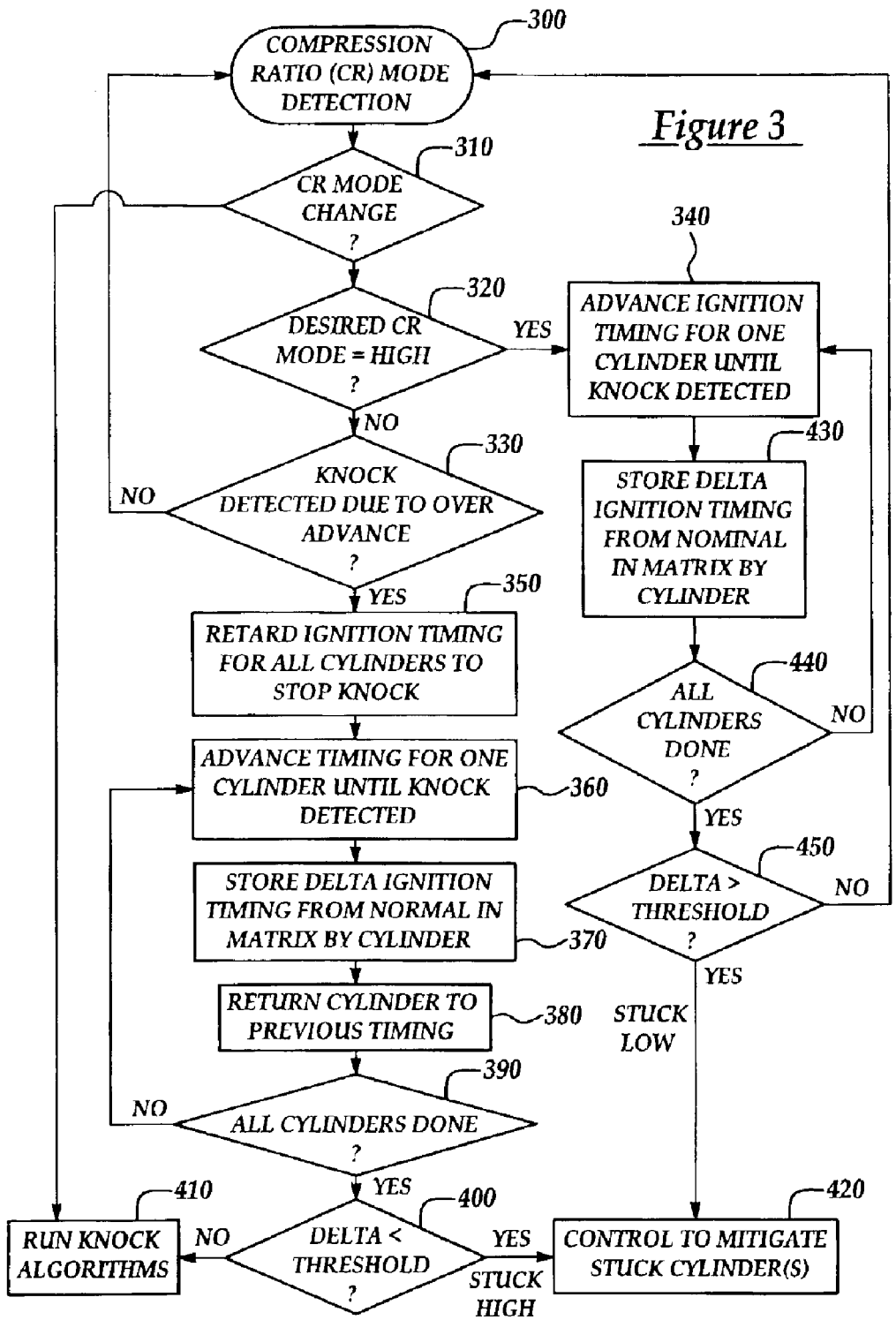

ENGINE CONTROL WITH OPERATING MODE DETECTION

BACKGROUND OF INVENTION

1. Field of the Invention

The present invention relates to a system and method for detecting an operating mode of an internal combustion engine, particularly after a commanded mode transition, and controlling the engine based on the detected operating mode.

2. Background Art

Internal combustion engine technology is becoming increasingly more sophisticated and complex in an effort to achieve the optimal balance between performance, fuel economy, emissions, and cost. Rather than the historical approach of compromising design trade-offs when designing an engine to achieve certain performance characteristics under some limited operating conditions, current strategies often incorporate multiple engine operating modes that may alter control strategies or physical engine characteristics to improve performance under more operating conditions, with the ultimate goal of achieving optimal performance under all operating conditions. For example, different operating modes may be provided to alter valve timing, spark timing, air/fuel ratio, or compression ratio, for example, based on engine and ambient operating conditions including idle, part-throttle, full throttle, low load, high load, high altitude, low temperature, and high temperature, for example. The engine controller determines an appropriate operating mode and commands a mode transition based on the current or anticipated engine or ambient operating conditions.

The demands of customers and regulatory bodies alike dictate continuous and comprehensive monitoring of engine performance, and mitigation of performance degradations in individual components or entire systems during various operating modes. Additional sensors may be added to the system to more closely monitor engine operation and quickly and accurately diagnose anomalous operation of one or more interrelated components or systems. However, even if an appropriate sensor is available for use in monitoring a particular component or condition, adding sensors may unnecessarily increase the cost and complexity of the engine. For many applications, suitable sensors may not be available, due to packaging, cost, reliability, accuracy, or other considerations. As such, it is desirable to monitor and diagnose anomalous operation for various operating modes using existing engine sensors and/or actuators.

Variable compression ratio (VCR) internal combustion engines have been developed with one or more operating modes corresponding to lower and higher cylinder compression ratios to balance considerations for performance, fuel economy, and emissions for varying ambient and operating conditions. A number of implementations of VCR engines exist. One approach is to modify the connecting rod length using fluid pressure to adjust the position of the connecting rod and/or piston relative to the crankshaft to increase or decrease the effective piston stroke. To determine whether a particular cylinder is operating in a lower or higher compression ratio mode, cylinder pressure sensors, proximity sensors, accelerometers, and/or crankshaft position sensors may be used. However, this adds cost and complexity to the system with potential manufacturing and durability considerations. As such, for VCR engines, it is desirable to determine or detect whether one or more cylinders that have been commanded to change compression ratio operating modes has responded appropriately without requiring one or more additional sensors.

SUMMARY OF INVENTION

The present invention solves various problems associated with the prior art recognized by the present inventors by providing a system and method for detecting an operating mode of an engine or engine component by modulating a first engine parameter and analyzing a change in a second engine parameter in response to modulating the first engine parameter to detect a current operating mode based on changes in at least one of the first and second engine parameters. In a variable compression ratio (VCR) engine embodiment, the system and method modify ignition timing of at least one cylinder until engine knock is detected and determine whether the cylinder is operating in the lower compression ratio mode or the higher compression ratio mode by comparing the ignition timing change required to cause engine knock to a corresponding threshold. The system and method may perform the operating mode determination or test in response to a request or command to change operating modes to detect one or more cylinders that did not respond as expected and implement mitigating control strategies accordingly.

The present invention provides a number of advantages. For example, the present invention can detect the operating mode of an engine or engine component using existing sensors rather than requiring additional sensors. For variable compression ratio engine applications, the present invention can identify one or more cylinders that do not transition properly between lower and higher compression ratio modes so that appropriate control strategies may be executed.

The above advantages and other advantages, objects, and features of the present invention will be readily apparent from the following detailed description of the preferred embodiments when taken in connection with the accompanying drawings.

BRIEF DESCRIPTION OF DRAWINGS

FIG. 2 is a block diagram illustrating operation of a system or method for determining an operating mode according to the present invention; and FIG. 3 is a block diagram illustrating operation of a variable compression ratio engine embodiment for a system or method for determining an operating mode according to the present invention.

DETAILED DESCRIPTION

Figure 1:
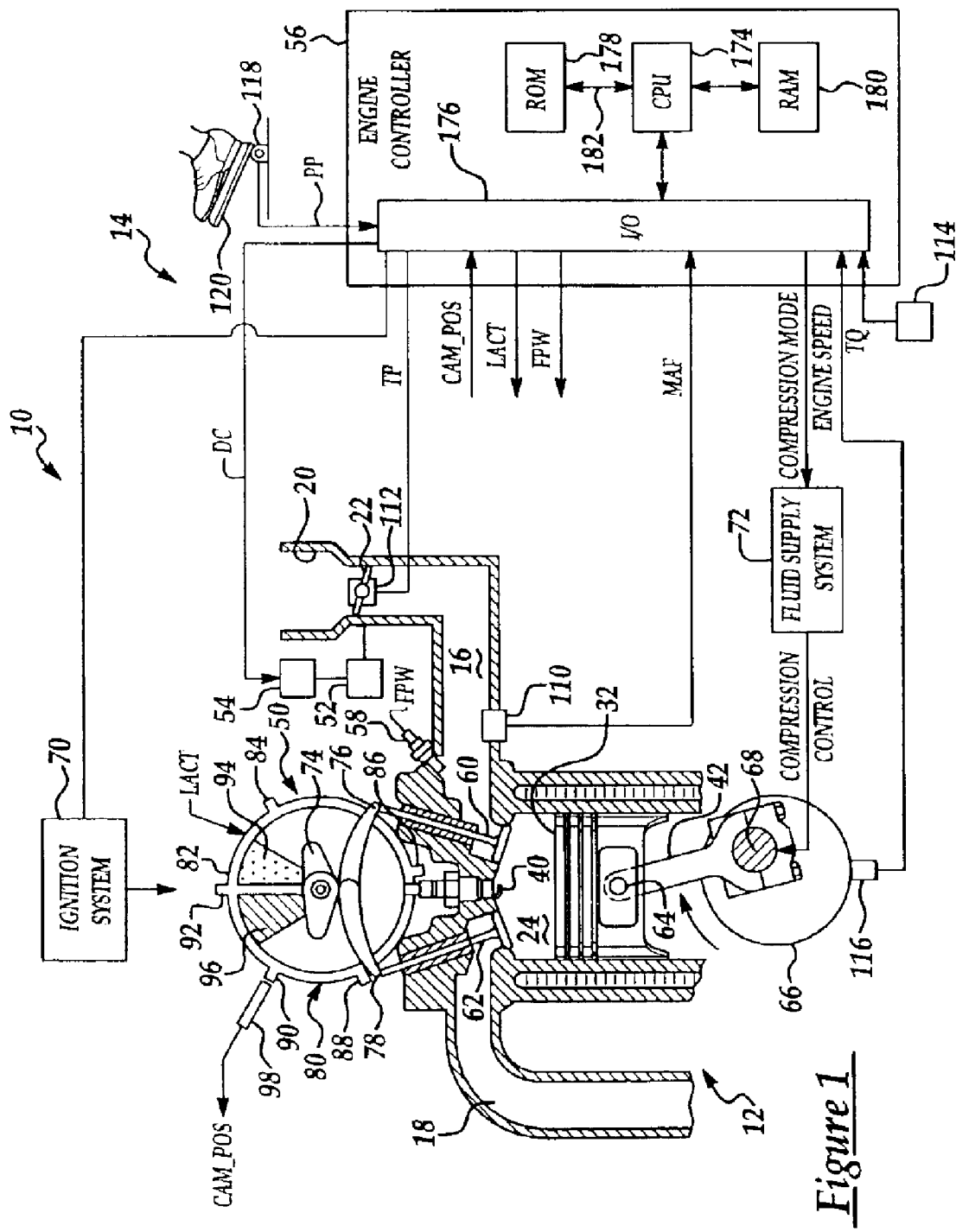
FIG. 1 is block diagram of a variable compression ratio engine and control system according to one embodiment of the present invention.

Referring now to FIG. 1, a vehicle 10 includes a multiple cylinder internal combustion engine 12 and an associated engine control system 14. As illustrated, engine control system 14 is in electrical and/or hydraulic communication with engine 12. Although illustrated as a four cylinder (one of which is shown), in-line, port fuel injected, spark-ignited, four-stroke engine, having a variable compression ratio and variable cam timing control, engine 12 represents any of a number of engine technologies having multiple operating modes and may include spark-ignited, compression ignition, and various hybrid engines, having multiple cylinders arranged in a "V" configuration, in-line configuration, or other configuration for example.

As used herein, compression ratio of a cylinder or internal combustion engine is defined as the ratio of the volume of a cylinder above the piston when the piston is at bottom-dead-center (BDC) to the volume of the cylinder above the piston when the piston is at top-dead-center (TDC). The present invention is independent of the particular engine technology, but may be useful for various implementations of variable compression ratio engines to detect whether one or more cylinders are operating in a lower compression ratio mode or a higher compression ratio mode, for example. Representative variable compression ratio implementations include those that use a pressure responsive device to vary effective length of a connecting rod via an eccentric ring disposed about a crankpin, or a gear arrangement, for example. Likewise, the present invention may be used to detect a cylinder operating mode for implementations having a device that can vary position of an engine cylinder relative to an engine crankshaft, such as a device having an eccentric crankshaft bearing where the operating position of the bearing is adjusted to vary the cylinder compression ratio, a device that can vary an internal geometry or volume of an engine cylinder, a device that can vary a piston geometry, such as a piston height or thickness for example, etc.

As also shown in FIG. 1, engine 12 includes an intake manifold 16, an exhaust manifold 18, a throttle body 20, a throttle plate 22, multiple cylinders represented by cylinder 24 with corresponding pistons contained therein as represented by piston 32 and associated spark plugs as represented by spark plug 40, connecting rod assemblies represented by assembly 42, and variable cam timing (VCT) mechanism 50.

In operation, intake manifold 16 communicates with throttle body 20 with intake air modulated via electronically controlled throttle plate 22. Throttle plate 22 is controlled by electric motor 52 in response to a signal received from ETC driver 54 based on a corresponding control signal (DC) received from a controller 56 generated in response to a requested torque or power via position of accelerator pedal 120 as determined by pedal position sensor 118. A throttle plate position sensor 112 provides a feedback signal (TP) for closed loop control of throttle plate 22. Air inducted into intake throttle body 20 passes through intake manifold 16 and mass airflow sensor 110, which provides a corresponding signal (MAF) indicative of the mass airflow to controller 56 for use in controlling the engine. In addition, controller 56 may communicate with various other sensors to monitor engine operating conditions and control engine operation, such as a torque sensor 114, engine sensor 116, and/or one or more knock sensors 118. Torque sensor 114 generates a signal (TQ) representative of an engine crankshaft torque, a transmission torque (torque converter, input shaft, or output shaft torque), or an axle torque, for example. Engine speed sensor 116, which may be a Hall-effect sensor, generates a signal (N) indicative of engine speed. One or more conventional knock sensors 118 may be used to detect knock in a particular cylinder or cylinders based on the signal provided to controller 56 and the relative angular position of crankshaft 66.

Cylinder 24 communicates with intake manifold 16 and exhaust manifold 18 via one or more respective intake and exhaust valves represented by intake valve 60 and exhaust valve 62. Cylinder 24 includes a combustion chamber having an associated reciprocating piston 32 operably disposed therein. Piston 32 is connected to connecting rod assembly 42 via a wrist pin 64. Connecting rod 42 is further coupled to crankshaft 66 via a crankpin 68. Ignition timing for ignition of an air-fuel mixture within cylinder 24 is controlled via spark plug 40, which delivers an ignition spark responsive to a signal from distributorless ignition system 70. As well known in the art, ignition timing is typically measured in degrees based on angular position of crankshaft 66 relative to a position corresponding to top dead center (TDC), i.e. the highest point of piston 32 within cylinder 24. For the port fuel injection engine illustrated, intake manifold 16 includes a fuel injector 58 coupled thereto for delivering fuel in proportion to the pulse width of one or more signals (FPW) from controller 56. Fuel is delivered to fuel injector 58 by a conventional fuel system (not shown) including a fuel tank, fuel pump, and fuel rail, for example.

As also shown in FIG. 1, engine 12 may include a variable cam timing (VCT) mechanism 50 to vary the actuation time of intake and exhaust valves 60, 62 for each cylinder 24. VCT mechanism 50 cooperates with a camshaft 74, which is shown communicating with rocker arms 76, 78 for variably actuating valves 60, 62. Camshaft 74 is directly coupled to housing 80, which forms a toothed cam wheel 82 having teeth 84, 86, 88, 90, 92. Housing 80 is hydraulically coupled to an inner shaft (not shown), which is in turn directly linked to camshaft 74 via a timing chain (not shown). Therefore, housing 80 and camshaft 74 rotate at a speed substantially equivalent to the inner camshaft. The inner camshaft rotates at a constant speed ratio relative to crankshaft 66. The position of camshaft 74 relative to crankshaft 66 can be varied by hydraulic pressure in advance chamber 94 and/or retard chamber 96. By allowing high-pressure hydraulic fluid to enter advance chamber 94, the relative relationship between camshaft 74 and crankshaft 66 is advanced. Thus, intake valve 60 and exhaust valve 62 open and close at a time earlier than normal relative to crankshaft 66. Similarly, by allowing high-pressure hydraulic fluid to enter retard chamber 96, the relative relationship between camshaft 74 and crankshaft 66 is retarded. Thus, intake valve 60 and exhaust valve 62 open and close at a time later than normal relative to crankshaft 66.

Teeth 84, 86, 88, 92 of cam wheel 82 are coupled to housing 80 and camshaft 74 and allow for measurement of relative position of camshaft 74 via cam timing sensor 98 which provides signal CAM_POS to controller 56. Tooth 90 is used for cylinder identification. As illustrated, teeth 84, 86, 88, 92 may be evenly spaced around the perimeter of cam wheel 82. Controller 56 sends control signal LACT to a conventional solenoid spool valve (not shown) to control the flow of hydraulic fluid into either advance chamber 94, retard chamber 96, or neither. Relative position of camshaft 74 can be measured in general terms, using the time, or rotation angle between the rising edge of a PIP signal and receiving a signal from one of teeth 84, 86, 88, 90, 92 as is known.

Controller 56 may transition between various operating modes depending upon the particular application and current engine and/or ambient operating conditions. As used herein, operating modes may refer to a control strategy or change in physical characteristics of a system, subsystems, or component of engine 12 and is generally referred to as an "engine operating mode" or simply an "operating mode." For example, various combustion modes may be used in some engines as characterized by varying air/fuel ratios, multiple injections, varying valve timing, etc. Likewise, various engine or ambient conditions may trigger corresponding operating mode changes or transitions such as a cold start mode, over temperature mode, high altitude mode, etc. Those of ordinary skill in the art will recognize numerous other operating modes for which the present invention may be used to detect or determine whether a mode transition has occurred by modulating an engine parameter and analyzing a change in operation in response to the modulation as described in greater detail below. Engine, vehicle, or powertrain control system 14 controls operation of engine 12 including effecting a change in the compression ratio of one or more cylinders 24 via fluid supply system 72 and connecting rod assembly 42 in response to signals received from controller 56. A more detailed description of an exemplary implementation for changing compression ratio in response to a signal from controller 56 is provided in commonly owned and copending U.S. Ser. No. 10/105,750 filed Mar. 25, 2002 titled System and Method for Controlling an Engine, the disclosure of which is hereby incorporated by reference in its entirety. Preferably, engine 12 is operable in at least one lower compression ratio operating mode and at least one higher compression ratio operating mode. As will be appreciated by those of ordinary skill in the art, each connecting rod assembly 42 may be configured to provide one or more intermediate compression ratios for a corresponding cylinder 24 of engine 12. The terms "high" or "higher" compression ratio operating modes refer to any cylinder or engine compression ratio that is greater than any second cylinder or engine compression ratio referred to as a "low" or "lower" compression ratio, with the number of compression ratios and corresponding values varying by application.

Engine controller 56 includes a microprocessor or central processing unit (CPU) 174 in communication with various engine sensors and actuators via input/output (I/O) ports 176. CPU 174 also communicates via a data/address bus 182 with one or more temporary or persistent computer readable storage media as represented by read-only memory (ROM) 178 and random-access memory (RAM) 180. The computer readable storage media may be implemented using various types of memory devices and technologies to provide temporary and/or persistent memory or storage such as PROMs, EPROMs, EEPROMs, flash memory, or any other electric, magnetic, or optical memory capable of storing data, code, instructions, calibration information, operating variables, and the like used by CPU 174 in controlling the engine.

The diagrams of FIGS. 2 and 3 generally represent control logic for one embodiment of a system or method according to the present invention. As will be appreciated by one of ordinary skill in the art, the diagrams may represent any one or more of a number of known processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages of the invention, but is provided for ease of illustration and description. Whether or not explicitly illustrated, one of ordinary skill in the art will recognize that one or more of the illustrated steps or functions may be repeatedly performed depending upon the particular processing strategy being used.

Preferably, the control logic is implemented primarily in software executed by a microprocessor-based engine controller, such as controller 52 (FIG. 1). Of course, the control logic may be implemented in software, hardware, or a combination of software and hardware, and/or may be shared distributed among one or more controllers in communication with each other depending upon the particular application. When implemented in software, the control logic is preferably provided in a computer-readable storage medium having stored data representing instructions executed by a computer to control the engine. The computer-readable storage medium or media may be any of a number of known physical devices which utilize electric, magnetic, and/or optical devices to temporarily or persistently store executable instructions and associated calibration information, operating variables, and the like.

A diagram illustrating operation of one embodiment of a system or method for determining or detecting an operating mode according to the present invention is shown in FIG. 2. The process, test, or routine to determine the operating mode of the engine or component may be triggered or executed in response to a command to transition between operating modes as represented by block 200. Of course, various other alternatives are possible. The process may be run periodically as part of a background loop or pass, or may be interrupt driven, for example. While a requested mode change may trigger the operating mode determination, the process or method is preferably completed while operating in a single operating mode, i.e. after the transition has been or should have been completed. As represented by block 210, the system or method include modulating a first engine parameter to induce a change in a second engine parameter. As those of ordinary skill in the art will appreciate and understand, modulating a parameter includes any change to the parameter, such as numerically increasing, decreasing, scaling, or other arithmetic or mathematical computation in addition to use of a look up table, function, or the like. The modulation or change may be unidirectional (monotonic), bi-directional, or oscillating, for example, depending upon the particular parameter and the expected change in the selected second engine parameter. The first engine parameter is preferably a control parameter that induces a measurable or observable change in engine operation, where engine operation includes various components, systems, and subsystems. The first parameter is preferably selected based on the particular type of operating mode for which the determination is being made, and modulation of the parameter should not change the current operating mode. For example, selection of a first engine operating parameter to detect a change in compression ratio operating mode according to one embodiment of the invention calls for a control parameter capable of being modulated or changed that will induce a change in a second operating parameter based on whether the engine, or a particular cylinder, is operating in a higher compression ratio mode or a lower compression ratio mode. The parameter changes are monitored or stored for subsequent processing to determine the operating mode.

The change in the first parameter, as determined by the modulation strategy, relative to the change in the second parameter is analyzed as represented by block 220. For example, if ignition timing is selected as the first parameter for a determination of the compression ratio operating mode and cylinder knock is selected as the second parameter, ignition timing would be modulated with the presence or absence of engine knock being observed relative to the ignition timing. In this example, the change in the first engine parameter relative to the change in the second parameter is analyzed to determine whether a cylinder is operating in a lower compression ratio mode or a higher compression ratio mode. The analysis may include comparing a change in the first and/or second parameter as a result of the modulation to a corresponding threshold as represented by block 222. For example, the change in ignition timing necessary to induce cylinder knock may be compared to a corresponding threshold to determine the operating mode as described in greater detail with reference to FIG. 3.

The steps of modulating and analyzing may be selectively repeated as represented by block 230, such as when determining an operating mode for multiple components of a system or subsystem, for example. The operating mode is then determined for each component or subsystem, or for the engine, as represented by block 240. The engine and/or individual components or subsystems may then be controlled appropriately based on the operating mode determination as represented by block 250.

As described above, the present invention may be used to determine an operating mode of the engine as a whole or separate components or subsystems, such as determining an operating mode for each cylinder, for example. Likewise, the present invention may be used to detect an expected or normal operating mode, or to detect or determine anomalous operation of one or more components or systems. For example, the present invention may be used to determine whether a particular system or subsystem has responded appropriately to a command from the engine to change operating modes. Alternative control strategies may be selected or implemented in response to detecting anomalous operation to mitigate any effect on performance, fuel economy and/or emissions. Particular alternative control strategies will depend upon the specific engine technology and type of anomalous condition detected. Representative mitigating control strategies for anomalous operation of a variable compression ratio engine may include limiting engine load or requested torque as represented by block 252, which may include closing charge motion control valves (CMCV's) 254 on engines so equipped, for example. Other strategies may include modifying valve timing to operate in a Miller combustion cycle 256, and/or retarding ignition timing 258, for example.

A block diagram illustrating operation of a variable compression ratio engine embodiment for a system or method for determining an operating mode according to the present invention is shown in FIG. 3. Block 300 generally represents the initiation of the process, test, or routine to determine the current compression ratio mode for one or more cylinders. As described above with reference to FIG. 2, the process may be periodically executed, or is preferably performed in response to a requested compression ratio (CR) mode change as represented by block 310. In the example illustrated, the operating mode determination proceeds differently depending upon the desired CR mode for one or more cylinders as determined by the engine controller. As such, the desired CR operating mode is checked at block 320. If no CR mode change has been commanded, control proceeds with knock algorithms 410. If the desired CR mode is a lower compression ratio mode, block 330 determines whether cylinder knock is being detected due to over advance of the ignition timing. If knock is not detected due to over advance, control returns to block 300. If knock is being detected, the ignition timing for all cylinders is retarded until the knock ceases as represented by block 350. Ignition timing is then incrementally advanced individually, e.g. for the current cylinder being considered, until knock is detected in that cylinder as represented by block 360. The delta ignition timing required to induce the knock, i.e. the difference between the scheduled ignition timing before the mode determination and the timing first associated with knock, is then stored in a matrix by cylinder number as represented by block 370. The timing for that cylinder is then returned to the previous (retarded) timing as represented by block 380. The process may then be repeated until all cylinders have been tested as represented by block 390.

When all cylinders have been tested with corresponding delta ignition timing stored in a matrix by cylinder number, each delta ignition timing value is compared to a corresponding threshold as represented by block 400. If the delta ignition timing threshold is greater than or equal to the threshold, the process determines that the current mode corresponds to the desired mode (lower CR mode) and the control proceeds with standard knock detection algorithms as represented by block 410. If the delta ignition timing value for a particular cylinder is less than the threshold, the process determines that the current CR mode for that cylinder (high) is different from the desired mode (low) and that the cylinder is stuck in high compression mode. Appropriate mitigating control strategies may then be implemented as indicated by block 420.

If the desired CR mode is "high" as represented by block 320, block 340 advances the ignition timing for the current cylinder until knock is detected. The delta ignition timing from the nominal or scheduled ignition timing that was necessary to induce the knock is then stored in a matrix by cylinder number as represented by block 430. The process may then be repeated for additional cylinders as represented by block 440 after returning the cylinder to its previous timing. The delta ignition timing for each cylinder is then compared to a corresponding threshold as represented by block 450. If the threshold is exceeded, the process determines that the current CR operating mode for the cylinder is "low" and control proceeds to block 420 for mitigation of a stuck cylinder. Otherwise, the process determines that the current CR operating mode (high) matches the desired operating mode (high) and the process is repeated as indicated at block 300.

While the best mode for carrying out the invention has been described in detail, those familiar with the art to which this invention relates will recognize various alternative designs and embodiments for practicing the invention as defined by the following claims.

What is claimed is:

1. A method for controlling a multi-cylinder internal combustion engine operable in one of a plurality of operating modes, the method comprising:
   generating a command to transition between a first operating mode and a second operating mode;
   modulating a first engine parameter to induce a change in a second engine parameter;
   analyzing the modulation of the first engine parameter relative to the change in the second engine parameter to detect a current operating mode.

2. The method of claim 1 wherein the plurality of operating modes comprises a first operating mode having a first associated cylinder compression ratio and a second operating mode having a second associated cylinder compression ratio.

3. The method of claim 1 wherein the step of modulating a first engine parameter does not change the operating mode.

4. The method of claim 1 wherein the steps of modulating and analyzing are performed while the engine is operating in a single one of the plurality of operating modes.

5. A method for controlling a multiple cylinder internal combustion engine having a device to vary a compression ratio of at least one cylinder during operation in a lower compression ratio mode and a higher compression ratio mode, the method comprising:
   modifying ignition timing of at least one cylinder until engine knock is detected; and
   determining whether the at least one cylinder is operating in the lower compression ratio mode or the higher compression ratio mode based on the ignition timing required to cause engine knock.

6. The method of claim 5 wherein the step of determining comprises:
   determining a difference between ignition timing for current operating conditions and the ignition timing required to cause engine knock; and comparing the difference to a corresponding threshold to determine the compression ratio mode.

7. The method of claim 5 further comprising:
commanding a compression ratio mode change, wherein the steps of modifying and determining are performed in response to commanding the compression ratio mode change.

8. The method of claim 5 further comprising:
detecting engine knock; and
retarding ignition timing of all cylinders to eliminate the engine knock prior to performing the steps of modifying and determining.

9. The method of claim 8 wherein the step of modifying comprises:
individually modifying ignition timing of one cylinder until engine knock is detected;
storing a difference between a nominal ignition timing and ignition timing associated with engine knock;
returning ignition timing of the one cylinder to its value before the step of individually modifying; and
repeating the steps of individually modifying, storing a difference, and returning ignition timing for each of the cylinders.

10. The method of claim 9 wherein the step of determining comprises comparing the difference between nominal ignition timing and ignition timing associated with engine knock to a corresponding threshold to determine the compression ratio mode.

11. The method of claim 10 wherein the step of determining comprises determining that a cylinder is operating in the higher compression ratio mode when the difference in ignition timing is less than the corresponding threshold.

12. The method of claim 5 further comprising:
resetting ignition timing to normal timing for current engine operating conditions; and
repeating the steps of modifying and resetting for each of the cylinders.

13. The method of claim 5 further comprising:
controlling the engine based on the compression ratio mode of the at least one cylinder.

14. The method of claim 5 further comprising performing the steps of modifying and determining in response to a command to change compression ratio mode.

15. A system for detecting an operating mode of at least one cylinder of a multiple cylinder internal combustion engine having cylinders operable in at least two operating modes corresponding to a lower cylinder compression ratio and a higher cylinder compression ratio, the system comprising:
at least one sensor for detecting engine knock;
a controller in communication with the at least one sensor, the controller modulating a control parameter to induce engine knock as indicated by the at least one sensor and determining the operating mode based on an amount of modulation required to induce the engine knock.

16. The system of claim 15 wherein the controller modulates ignition timing to induce engine knock.

17. The system of claim 16 wherein the controller determines the operating mode by comparing the amount of modulation to a corresponding threshold.

18. The system of claim 15 wherein the controller advances ignition timing to induce engine knock.

19. The system of claim 18 wherein the controller retards ignition timing to eliminate knock in all cylinders before the controller advances ignition timing to induce engine knock.

20. The system of claim 15 wherein the controller modulates the control parameter for one cylinder to induce engine knock, stores a value for the control parameter associated with engine knock, resets the control parameter to its value before modulation, and repeats modulation, storing, resetting and determining operation mode for each cylinder.

21. A computer readable storage medium having stored data representing instructions executable by a computer to control an internal combustion engine, the computer readable storage medium comprising:
instructions for modifying ignition timing of at least one cylinder until engine knock is detected; and
instructions for determining whether the at least one cylinder is operating in the lower compression ratio mode or the higher compression ratio mode based on the ignition timing required to cause engine knock.

22. The computer readable storage medium of claim 21 further comprising:
instructions for controlling the engine in response to the compression ratio mode.

* * * * *